United States Patent [19]

Pazos

[11] 4,412,043

[45] Oct. 25, 1983

[54] VULCANIZABLE ETHYLENE COPOLYMERS

[75] Inventor: Jose F. Pazos, Wilmington, Del.

[73] Assignee: E. I. Du Pont de Nemours and Company, Wilmington, Del.

[21] Appl. No.: 374,615

[22] Filed: May 3, 1982

[51] Int. Cl.$^3$ .............................................. C08F 8/32
[52] U.S. Cl. .................... 525/328.2; 525/327.6; 525/379; 525/381; 525/382; 526/272; 526/304
[58] Field of Search ................ 526/304; 525/379, 381, 525/382, 328.2, 327.6

[56] References Cited

U.S. PATENT DOCUMENTS

| | | | |
|---|---|---|---|
| 3,268,489 | 8/1966 | Dial | 260/78.5 |
| 3,541,033 | 11/1970 | Buttrick et al. | 260/8 |
| 3,556,792 | 1/1971 | Katz | 96/35.1 |
| 3,556,793 | 1/1971 | Field et al. | 96/35.1 |
| 3,679,561 | 7/1972 | Galiano et al. | 204/159.15 |
| 3,700,492 | 10/1972 | Bergomi | 117/155 |
| 3,714,298 | 1/1973 | Bergomi | 260/897 |
| 3,817,896 | 6/1974 | Bergmeister et al. | 260/29.6 |
| 3,883,472 | 5/1975 | Greene et al. | 260/42.52 |
| 3,887,653 | 6/1975 | Konishi et al. | 260/885 |
| 3,904,588 | 9/1975 | Greene | 260/78.5 |
| 3,933,761 | 1/1976 | Coleman | 260/78.5 |
| 3,972,961 | 8/1976 | Hammer et al. | 260/857 |
| 3,993,710 | 11/1976 | Alberts et al. | 260/862 |
| 4,026,851 | 5/1977 | Greene | 260/23 |

Primary Examiner—Stanford M. Levin

[57] ABSTRACT

Elastomeric ethylene/methyl or ethyl(meth)acrylate/4-(dialkylamino)-4-oxo-2-butenoic acid copolymers.

10 Claims, No Drawings

VULCANIZABLE ETHYLENE COPOLYMERS

DESCRIPTION

1. Technical Field

This invention relates to vulcanizable elastomeric copolymers comprising an ethylene/methyl or ethyl(meth)acrylate/4-(dialkylamino)-4-oxo-2-butenoic acid copolymer and elastomeric compositions containing such copolymers, and the method of curing such copolymers and/or compositions comprising reaction of copolymer and/or compositions of the present invention with diamine curatives.

2. Background Art

U.S. Pat. No. 3,904,588, granted Sept. 9, 1975 to Greene, discloses certain ethylene/methyl or ethyl(meth)acrylate/1,4-butenedioic acid ester copolymers. The present invention is based upon amide modification of the cure-site monomer in the Greene polymers and the more rapid cure rates attainable with the polymers of the present invention as compared with those of Greene.

DISCLOSURE OF THE INVENTION

The copolymers of the present invention contain by weight (a) from 15 to 60%, preferably 30 to 60% of ethylene if methyl acrylate is the comonomer, and more preferably 35 to 50%, of ethylene; (b) from 20 to 75%, preferably 45 to 65%, of methyl or ethyl(meth)acrylate, preferably methyl acrylate; and (c) from 0.15 to 0.5 moles per kilogram of copolymer, preferably 0.2 to 0.35 moles per kilogram of copolymer of 4-(dialkylamino)-4-oxo-2-butneoic acid, wherein the alkyl moiety is $C_1$–$C_{12}$ alkyl, optionally substituted with 1 or 2 $C_6$–$C_{12}$ aryl groups.

The preferred copolymers of the present invention will contain by weight approximately 45% ethylene, 49.4% methyl acrylate and 5.6% of 4-(di-n-butylamino)-4-oxo-2-butenoic acid.

The copolymers of the present invention can be prepared by copolymerizing ethylene, a comonomer solution of the methyl or ethyl(meth)acrylate and 1,4-butenedioic acid monoethyl ester in a methanol-t-butanol solvent mixture in a pressure reactor at 160° to 225° C. and a pressure of 150 to 200 MPa in the presence of a free-radical polymerization initiator as generally described in U.S. Pat. No. 3,883,472 to Greene and Lewis and U.S. Pat. No. 4,026,851 and U.S. Pat. No. 3,904,588, both to Greene. The comonomer solution preferably contains from 22 to 44 ppm of a stabilizer such as phenothiazine. The free radical polymerization initiator is dissolved in a mixture of methanol and t-butanol. The polymerization is run as a continuous process wherein ethylene, comonomer solution, solvent and initiator solution are fed continuously into the stirred autoclave. The addition rates depend on variables such as the polymerization temperature, pressure, monomers employed and the concentration of the monomers in the reaction mixture. The reaction mixture is continuously removed from the autoclave and is stripped of unpolymerized monomers and solvent under reduced pressure and at elevated temperature.

The resulting ethylene/methyl or ethyl(meth)acrylate/1,4-butenedioic acid monoethyl ester terpolymer is then heated under nitrogen in a vacuum oven at a temperature of at least 150° C. and a pressure of at least 200 mm Hg for at least 96 hours to convert the cure-site monomer to the corresponding anhydride.

The anhydride-containing polymer is then blended on a rubber mill with one or more amines selected from the group consisting of $C_1$–$C_{12}$ aliphatic secondary monoamines where the alkyl groups can be the same or different to convert the anhydride to the corresponding monodialkylamide.

The time of heating of ethylene/methyl or ethyl (meth)acrylate/1,4-butenedioic acid monoethyl ester copolymers under vacuum and nitrogen required to convert substantially all of the monoethyl ester to anhydride depends on the thickness of the sample as well as the temperature and pressure employed. To insure that the anhydride moiety is retained on cooling, all the ethanol formed at high temperatures must diffuse out of the copolymer and be volatilized, or the monoethyl ester will reform on cooling to normal storage temperatures.

Preferably, the copolymers of the present invention can be prepared by copolymerizing ethylene, a comonomer solution of the methyl or ethyl (meth)acrylate and maleic anhydride in a pressure reactor at 160° C. to 225° C. and a pressure of 150–200 MPa in the presence of a free-radical polymerization initiator as generally described in U.S. Pat. No. 3,883,472, granted May 13, 1975 to Greene and Lewis and U.S. Pat. No. 4,026,851, granted May 31, 1977, and U.S. Pat. No. 3,904,588, granted Sept. 9, 1975, both to Greene. The comonomer solution preferably contains from 10 to 100 ppm of a stabilizer such as p-quinone or p-methoxyphenol. The free radical polymerization initiator is dissolved in t-butylbenzene. The polymerization is run as a continuous process wherein ethylene, comonomer solution, telogen and initiator solution are fed continuously into the stirred autoclave. The addition rates depend on variables such as the polymerization temperature, pressure, monomers employed and the concentration of the monomers in the reaction mixture. The reaction mixture is continuously removed from the autoclave and is stripped of unpolymerized monomers and solvent under reduced pressure and at elevated temperature. The resulting anhydride-containing copolymer can be converted to the corresponding monodialkylamide-containing copolymer as described above.

The copolymers of the present invention can be vulcanized for about 1 to 60 minutes at about 140° to 200° C., preferably 5 to 10 minutes at 160° to 177° C., in the presence of certain primary or secondary aliphatic diamines or polyamines or derivatives of the amines such as carbamates or salts of weak acids, e.g. pKa 3.0. Suitable amine curatives include hexamethylenediamine (HMDA), hexamethylenediamine carbamate (HMDAC), and ethylenediamine (EDA), and are described more fully in U.S. Pat. No. 3,883,472, granted May 13, 1975 to Greene et al, which is hereby incorporated herein by reference.

The amount of amine used in the curing of the copolymers of the present invention ranges from 0.21 to 0.87 mole per mole of 4-(dialkylamino)-4-oxo-2-butenoic acid in the copolymer. However, the fastest cure rates, lowest compression sets, highest $M_{100}$ values, lowest $E_B$ and the best heat aging properties are obtained using a stoichiometric amount of HMDAC, i.e. a molar amount equal to ½ the molar amount of 4-(dialkylamino)-4-oxo-2-butenoic acid in the copolymer.

HMDAC is particularly preferred for curing the copolymers of the present invention and combines very fast cure rates with excellent processing safety and provides vulcanizates with good heat aging properties.

The vulcanizates of the present invention can also contain an antioxidant of the phosphorous ester type or the amine type or a mixture of the two.

Suitable phosphorus ester compounds include:
tri (mixed mono- and dinonylphenyl) phosphite tris(3,5-di-t-butyl-4-hydroxyphenyl)phosphate tricresyl phosphate
a high M.W. poly(phenolic phosphonate)
6-(3,5-di-t-butyl-4-hydroxy)benzyl-6H-dibenz[c,e]-[1,2]oxyphosphorin-6-oxide Suitable amine antioxidants include polymerized 2,2,4-trimethyl-1,2-dihydroquinoline, N-phenyl-N'-(p-toluenesulfonyl)-p-phenylenediamine, N,N'-di($\beta$-naphthyl)-p-phenylenediamine; the low temperature reaction product of phenyl ($\beta$-naphthyl)amine and acetone, and 4,4'-bis-($\alpha$,$\alpha$-dimethylbenzyl) diphenylamine.

The proportion of antioxidant in the vulcanizable composition is about 0.1 to 5 parts, preferably 1 to 3 parts, per 100 parts copolymer (phr).

A preferred antioxidant composition consists of a 1 to 1 by weight mixture of tris(mixed mono- and dinonylphenyl)phosphite and 4,4'-bis-($\alpha$,$\alpha$-dimethylbenzyl) diphenylamine.

Elastomeric and/or reinforcing fillers and plasticizers can be added to reduce cost and to improve the mechanical properties of the vulcanizate. A typical vulcanizable composition will usually contain from 0 to 125 phr, preferably from 40 to 80 phr, of a carbon black filler. The amide acid moiety of the polymers of the present invention will react with strong bases or certain metal oxides to form ionomers. Ionomers of the polymers of the present invention may be desired where adhesive properties are needed.

The following examples illustrate this invention. All parts, percentages and proportions are by weight unless otherwise specified.

EXAMPLE 1

Preparation of Ethylene/Methyl Acrylate/Maleic Anhydride Copolymer 6.34 kg/h of ethylene plus 1.06 kg/h of liquid monomers containing by weight 97.2% methyl acrylate (MA), 2.7% maleic anhydride and 0.1% butylated hydroxy toluene (BHT) as well as 0.2–0.3 kg/h of methanol as telogen were fed continuously to a 720 ml adiabatic continuous stirred tank reactor. Reaction was initiated and maintained by the addition of di(sec-butyl)-peroxydicarbonate (20% PDC/80% t-butylbenzene). Reaction conditions: Reactor temperature=160° C., Feed temp.=25° C. Pressure=186 MPa, Total monomer conversion=15±1%. Comonomers were introduced into the hot reactor at appropriate reactor pressures to avoid phase separation. Approximately 6.5 kg of E/MA/maleic anhydride polymer was made with a measured composition of 46.5/51/2.5 wt % and a melt flow rate (2160 grams weight, 190° C.) of 7–9.

EXAMPLE 2

Preparation of Amide-Containing Terpolymer 100 parts of the copolymer of Example 1 were mixed on a rubber mill with 4 parts of di-n-butylamine to convert the anhydride to the corresponding acid amide at room temperature. The copolymer composition was about 49.4 weight percent methyl acrylate, 5.6 weight percent 4-(di-n-butylamino)-4-oxo-2-butenoic acid, and 45.0 weight percent ethylene. The cure site monomer comprised 0.255 mole per kilogram of copolymer.

EXAMPLES 3 AND 4

Compounding and Curing of the Polymer 100 parts of the copolymer of Example 2 and 100 parts of a copolymer containing 42 weight percent ethylene, 54 weight percent methyl acrylate and 4 weight percent 1,4-butenedioic acid monoethyl ester (0.28 mole per kilogram of copolymer) were each mixed on a rubber mill with the following ingredients as Examples 3 and 4, respectively, and tested for processing safety and cure rate.

|  | Parts by Weight |
|---|---|
| "Polygard" [tris (nonylphenyl) phosphite] | 1 |
| "Naugard" 445 [substituted diphenylamine] | 1 |
| SRF Carbon Black (N774) | 20 |
| FEF Carbon Black (N550) | 50 |
| Dioctyl Sebacate | 10 |
| "Santicizer" 409 [polyester plasticizer] | 10 |
| Di-ortho-tolyl guanidine | 4 |
| "Diak" No. 1 [hexamethylenediamine carbamate] | 1.25 |

|  | Example 3 | Example 4 |
|---|---|---|
| Mooney Scorch at 121° C. | | |
| Minimum Value | 13.0 | 6.9 |
| 10 point rise, minutes | 3.4 | 11.4 |
| ODR Data at 177° C. | | |
| Maximum torque, dN · m | 25.3 | 24.5 |
| Minimum torque, dN · m | 2.0 | 1.0 |
| T$_c$-90, minutes | 3.1 | 7.0 |
| Maximum cure rate, dN · m/min | 16.5 | 8.1 |

Despite a slightly lower concentration of cure site in Example 3 the cure rate with diamines is about twice that of Example 4.

EXAMPLE 5

Preparation of Anhydride-Containing Terpolymer

About 1.8 kilograms of a copolymer comprising ethylene, (42% by weight) methyl acrylate (54% by weight), and 1,4-butenedioic acid monoethyl ester (4% by weight) were heated under nitrogen in a vacuum oven at about 180° C. and 200 mm for 144 hours. After blending on a rubber mill aliquots of the blend were dissolved in tetrahydrofuran (0.5 g of polymer in 100 ml THF) and the total acidity was determined by titrations with standard aqueous sodium hydroxide and ethanolic potassium hydroxide solutions. Found: 0.52 meq/g of polymer (aqueous NaOH); 0.25 meq/g of polymer (ethanolic KOH). An average value of 0.26 meq of anhydride/gram of polymer was obtained. This corresponds to 93.6% of the monoethyl ester of 1,4-butenedioic acid originally present.

EXAMPLE 6

Preparation of Amide-Containing Terpolymer 150 grams of the anhydride containing polymer of Example 4 and 3.62 grams (0.0416 mole) of morpholine were mixed on a rubber mill, cooled internally with cold water and stored at room temperature overnight. An infrared spectrum of the polymer showed complete disappearance of the bands at 1820 cm$^{-1}$ and 1750 cm$^{-1}$ of the anhydride carbonyl groups.

EXAMPLE 7

Preparation of Amide-Containing Terpolymer

A 150 gram portion of the polymer of Example 5 was mixed on a rubber mill with 5.37 grams (0.0416 mole) of di-n-butylamine and stored overnight at room temperature. An infrared spectrum showed complete disappearance of the anhydride.

EXAMPLES 8, 9 AND 10

Compounding and Curing of Polymer

The original polymer used in Example 5 and the polymers of Examples 6 and 7 were mixed on a rubber mill with the following ingredients. Quantities (parts by weight) are indicated in parenthesis. Polymer (100), fumed silica (10), microcrystalline wax (3) stearic acid (0.5), ground calcium carbonate (50), precipitated calcium carbonate (15), stearylamine (0.5), 4,4'-butylidenebis(6-t-butyl-m-cresol) (2), butadiene/acrylonitrile copolymer (10), hexamethylenediamine carbamate (1.25), and diphenylguanidine (4). Samples of each stock were checked for Mooney scorch at 121° C. and Oscillating Disk Rheometer data at 177° C.

|  | Example 8 | Example 9 | Example 10 |
|---|---|---|---|
| Polymer | Example 5 | Example 6 | Example 7 |
| Mooney Scorch at 121° C. |  |  |  |
| Minimum value | 10 | 27 | 14 |
| 10 pt rise, min. | 13 | 1 | 9.5 |
| ODR Data at 177° C. |  |  |  |
| Minimum torque, dN · m | 0.6 | 5.7 | 1.1 |
| Torque at 30 min. dN · m | 38.4 | 53.7 | 50.9 |
| $t_c90$, min | 16 | 1.8 | 4.5 |
| Maximum cure rate, dN · m/min | 9.0 | 31.6 | 18.6 |

EXAMPLES 11, 12, 13 AND 14

Temperature Effect on Preparation of Amide-Containing Terpolymer 4.8 kilograms of a copolymer similar to the one used in Example 5 were mixed with 172.8 grams (1.33 moles) of di-n-butylamine in a Banbury Mixer for about five minutes and dumped at 95° C. The stock was sheeted out on a rubber mill and divided into three equal parts. One portion was fed to a mixer extruder heated at 170° C. and with an average residence time of ten minutes. The second portion was treated similarly but with the temperature raised to 185° C. The third portion was mixed and extruded at 200° C. in the same apparatus. After cooling and blending each portion on a rubber mill a sample of each was analyzed for free amine.

| Example | Heat Treatment | Meq/g Free Amine | % of Original |
|---|---|---|---|
| 11 | none | 0.22 | 79 |
| 12 | 10 min/170° C. | 0.11 | 39.6 |
| 13 | 10 min/185° C. | 0.11 | 39.6 |
| 14 | 10 min/200° C. | 0.08 | 29 |

EXAMPLE 15

Compounding and Curing of Partly Amide-Modified Polymer

The copolymer of Examples 11, 12, 13 and 14 were compounded on a rubber mill with the following recipe.

| Ingredients | PHR |
|---|---|
| Polymer | 100 |
| "Multiwax" 180M (Microcrystalline wax) | 3 |
| Stearic Acid | 0.5 |
| "Weston" 600 (didecylpentaerythritol diphosphite) | 3 |
| "Agerite" GT (1,3,5-tris[3,5-di-t-butyl-4-hydroxybenzyl]-s-triazine-2,4,6(1H,3H,5H)-trione) | 2 |
| "Cab-O-Sil" MS7 (fumed silica) | 15 |
| "Hydral" 710 (hydrated alumina) | 15 |
| "Atomite" Whiting (calcium carbonate) | 100 |
| "Ti-Pure" R960 (titanium dioxide) | 5 |
| "Diak" No. 1 (hexamethylenediamine carbamate) | 1.25 |
| Diphenylguanidine | 4 |

| Polymer | Ex. 11 | Ex. 12 | Ex. 13 | Ex. 14 |
|---|---|---|---|---|
| Mooney Scorch at 121° C. |  |  |  |  |
| Minimum value | 17 | 14 | 15 | 18.5 |
| 10 pt rise, min. | 6.0 | 6.0 | 5.8 | 4.3 |
| ODR Data at 177° C. |  |  |  |  |
| Maximum torque, dN · m | 58 | 60 | 63 | 68 |
| $t_c90$, min | 9.0 | 5.8 | 5.3 | 4.0 |
| Maximum cure rate, dN · m/min | 14.7 | 20.3 | 22 | 27 |

These examples show that even with partial replacement of the ester group of 1,4-butenedioic acid with di-n-butylamine the cure rate with hexamethylenediamine carbamate is faster than control Example 11.

INDUSTRIAL APPLICABILITY

The vulcanizable compositions of the present invention can be used in a wide variety of industrial applications, including ignition wire jacketing, spark plug boots, hoses, belts, miscellaneous molded boots, seals and gaskets.

Best Mode

Although the best mode of the present invention, i.e., the single best copolymer of the present invention, will depend upon the particular desired end use and the specific requisite combination of properties for that use, the single most preferred copolymer of the present invention is that described in detail in Example 2.

I claim:

1. A vulcanizable elastomeric copolymer consisting essentially of copolymerized units of:
   (a) 20–75 weight percent of a comonomer selected from the group consisting of methyl acrylate, methyl methacrylate, ethylacrylate and ethyl methacrylate,
   (b) 0.15–0.5 mole of a cure-site monomer selected from the group consisting of 4-(dialkylamino)-4-oxo-2-butenoic acid per kilogram of copolymer, wherein the alkyl moiety is $C_1$–$C_{12}$ alkyl substituted with 0–2 $C_6$–$C_{12}$ aryl groups, and
   (c) a complemental amount of ethylene from 15–60 weight percent.

2. The composition of claim 1 wherein
   (a) the comonomer comprises 45–65 weight percent,
   (b) the cure-site monomer comprises 0.2–0.35 moles per kilogram of copolymer, and (c) the ethylene comprises 35–50 weight percent.

3. The copolymer of claim 1 wherein the comonomer is methyl acrylate.

4. The copolymer of claim 1 wherein the cure-site monomer is selected from the group consisting of 4-(di-n-butylamino)-4-oxo-2-butenoic acid, 4-(N-ethylbenzylamino)-4-oxo-2-butenoic acid, and 4-(didodecylamino)-4-oxo-2-butenoic acid.

5. The copolymer of claim 1 wherein the cure-site monomer is 4-(di-n-butylamino)-4-oxo-2-butenoic acid.

6. The copolymer of claim 1 which consists essentially of copolymerized units of:
   (a) about 49.4 weight percent methyl acrylate,
   (b) about 5.6 weight percent 4-(di-n-butylamino)-4-oxo-2-butenoic acid, and
   (c) about 45 weight percent ethylene.

7. A method of vulcanizing an elastomeric composition, said composition comprising a copolymer consisting essentially of copolymerized units of:
   (a) 20–75 weight percent of a comonomer selected from the group consisting of acrylic and vinyl esters,
   (b) 0.15–0.5 moles of a cure-site monomer per kilogram of copolymer, said cure-site monomer selected from the group consisting of 4-(dialkylamino)-4-oxo-2-butenoic acids, and
   (c) a complemental amount of ethylene from 15–60 weight percent,
said method comprising mixing with said composition a curing agent selected from the group consisting of primary aliphatic diamines, primary aromatic diamines, primary aliphatic polyamines, and generators of the above-listed amines, and then heating the resulting mixture.

8. The method of claim 7 wherein the curing agent is mixed with said composition in an amount of 0.21–0.87 moles of curing agent per mole of cure-site monomer in the composition.

9. A vulcanizable elastomeric composition comprising the copolymer of claim 1.

10. Vulcanized articles produced from the copolymer of claim 9.

* * * * *